United States Patent

Muramatsu

[11] Patent Number: 5,940,463
[45] Date of Patent: Aug. 17, 1999

[54] IN-VESSEL STRUCTURE FOR FAST REACTORS

[75] Inventor: Toshiharu Muramatsu, Ibaraki-ken, Japan

[73] Assignee: Japan Nuclear Cycle Development Institute, Ibaraki-ken, Japan

[21] Appl. No.: 09/143,439

[22] Filed: Aug. 28, 1998

[30] Foreign Application Priority Data

Sep. 29, 1997 [JP] Japan ................................. 9-281332

[51] Int. Cl.$^6$ ............................ G21C 11/08; G21C 15/12
[52] U.S. Cl. .......................... 376/399; 376/290; 376/403
[58] Field of Search ..................................... 376/290, 298, 376/299, 361, 395, 399, 403; 165/135, 904

[56] References Cited

U.S. PATENT DOCUMENTS 5,043,135 8/1991 Hunsbedt et al. ....................... 376/299

FOREIGN PATENT DOCUMENTS 0 398 733 11/1990 European Pat. Off. .

OTHER PUBLICATIONS

"Study on Flow Optimization in Reactor Vessel of Top–Entry Loop–Type DFBR", ICONE–3 (3rd International Conference on Nuclear Engineering) vol. 1, Kyoto, Japan (Apr. 1995).
Patent Abstracts of Japan, vol. 096, No. 001, Jan. 31, 1996 & JP 07 248389 A (Toshiba Corp), Sep. 26, 1995.

*Primary Examiner*—Daniel D. Wasil
*Attorney, Agent, or Firm*—Wenderoth, Lind & Ponack, L.L.P.

[57] ABSTRACT

An in-vessel structure for a top-entry type fast reactor wherein a core is positioned in the interior of a reactor vessel, an upper core structure being provided above the core, a coolant passing through a cold leg piping inserted from an upper portion of the reactor vessel thereinto and reaching the core, in which the coolant is heated, the coolant then flowing out to an upper plenum, the resultant coolant passing through a hot leg piping, which is inserted from an upper portion of the reaction vessel thereinto, and reaching the outside of the reactor vessel. A plurality of annular fins are fixed horizontally in an axially spaced manner to both the portions of an outer circumferential surface of the upper core structure and the opposite portions of an inner circumferential surface of the reactor vessel, these portions being under the free liquid surface during a rated operation of the reactor.

2 Claims, 6 Drawing Sheets

5,940,463

IN-VESSEL STRUCTURE FOR FAST REACTORS

BACKGROUND OF THE INVENTION

This invention relates to a top-entry type fast reactor into which a cold leg piping and a hot leg piping are inserted from an upper portion of a reactor vessel, and more particularly to an in-vessel structure for a fast reactor, provided with a plurality of annular fins fixed to both the outer circumferential surface of an upper core structure and the inner circumferential surface of a reactor vessel, whereby the fluctuation of a liquid surface is prevented to enable the safety of an operation of a fast reactor to be secured, and a plant operation controllability to be improved.

In a demonstration fast reactor designing in which a reactor vessel is made to smaller dimensions so as to improve the economical efficiency, the flow velocity of a coolant in the reactor vessel increases greatly due to the reduction of the dimensions of the reactor vessel and an increase in the reactor output. Therefore, cover gas entrainment in the coolant due to the interaction of the high-velocity coolant with a free liquid surface is apprehended. In a comparatively small-sized experimental fast reactor, a structure in which cold and hot leg pipings for a coolant are welded to a side wall of a bottomed cylindrical reactor vessel is employed. In this structure, a dip plate suspended from an upper shielding member is employed in some cases so as to prevent the cover gas entrainment in the coolant by suppressing the rippling of a free liquid surface of the coolant.

In a large-sized fast reactor, a top-entry type (top-feed and top-discharge type) structure in which cold and hot leg pipings are inserted from an upper portion of a reactor vessel is discussed with a view to simplifying the reactor vessel structure and improving the economical efficiency. In such a top-entry type large-sized fast reactor, the dip plate suspension structure cannot be employed, since the pipings of a primary main cooling system are inserted from an upper portion of the reactor vessel, and a plurality of pipings extend between the free liquid surface and the upper shielding member. In order to prevent the gas entrainment in the coolant by optimizing an in-vessel fluid flow in the top-entry type large-sized fast reactor, a construction has been proposed in which a flow guide structure comprising a horizontal ring plate of a large width extending over the whole inner circumferential surface of a reactor vessel, and a cylindrical perforated plate extending downward from an inner edge of the ring plate is provided (refer to "Study on Flow Optimization in Reactor Vessel of Top-Entry Loop-Type DFBR", ICONE-3 (3rd International Conference on Nuclear Engineering) vol. 1, Kyoto, Japan (April 1995)).

Such a top-entry type fast reactor is shown schematically in FIG. 6. A reactor core 12 is positioned in the interior of a reactor vessel 10, and an upper opening of the reactor vessel 10 is closed with a shielding plug 14, to which an upper core structure 16 is fixed. The upper core structure 16 includes therein various instrumentation devices and supporting members of a control rod-driving mechanism (not shown). A cold leg piping 18 is introduced from an upper opening of the reactor vessel 10 into a high-pressure plenum 20, while a hot leg piping 22 is led out from an upper plenum 24 so as to pass through the upper opening. A coolant sodium is supplied from the cold leg piping 18, enters the high-pressure plenum 20, and passes through a low-pressure plenum 26 to reach the core 12, in which the coolant sodium is heated. The heated coolant sodium flows out from a core outlet surface 12a into the upper plenum 24, and further flows through the hot leg piping 22 to reach an intermediate heat exchanger (not shown) disposed outside the reactor vessel. A part of the coolant sodium passing through the low-pressure plenum 26 flows out to an intermediate plenum 28.

A flow guide structure 30 is provided in the interior of the upper plenum 24. This flow guide structure 30 comprises a horizontal ring plate 32 of a large width provided so as to extend over the whole inner circumferential surface of the reactor vessel, and a cylindrical perforated plate 34 extending downward from an inner edge of the ring plate 32. The width of the ring plate 32 is set broadly so that it becomes not less than a half of a distance between the inner circumferential surface of the reactor vessel 10 and the outer circumferential surface of the upper core structure 16. The sizes now under discussion of various parts are, for example, as follows.

Diameter of the reactor vessel: 9.88 m
Diameter of the upper core structure: 2.85 m
Height of the free liquid surface: 6.10 m
Position of the annular plate: 2.94 m below the free liquid surface
Width of the ring plate: 2.00 m
Height of the cylindrical perforated plate: 1.00 m When the flow guide structure 30 is not provided, an in-vessel flow shown in FIG. 7A occurs. When the flow velocity of the coolant sodium increases, the coolant sodium leaving the core outlet surface 12a impinges upon a lower surface of the upper core structure 16 to form a diagonal flow advancing toward the reactor vessel wall. This diagonal flow impinges upon the reactor vessel wall, and rises along the same wall. This upward flow reaches the free liquid surface 50 and swells the same. Then, the flow runs toward the upper core structure 16 along the free liquid surface 50 and runs downward along the upper core structure. Due to such a flow of the high-velocity coolant, the rippling of the free liquid surface 50 becomes violent to cause the gas entrainment in the coolant to occur. On the other hand, when the flow guide structure 30 is provided as a rippling preventing means, an in-vessel flow shown in FIG. 7B occurs, i.e., the greater part of the high-velocity coolant sodium flowing out from the core outlet surface 12a is guided to the interior of the flow guide structure 30 and blocked by the cylindrical perforated plate 34. Thus, the fluctuation of the free liquid surface during a rated operation of the reactor is eliminated.

However, when such a flow guide structure 30 comprising the ring plate 32 and cylindrical perforated plate 34 is provided, the following problems arise, though the fluctuation of the free liquid surface 50 during a rated operation of the reactor can be prevented. When the reactor is emergency-stopped (plant tripping occurs) as shown in FIG. 8, low-temperature low-velocity sodium enters directly the interior of the hot leg piping 22 in which high-temperature sodium gathers as originally designed. Therefore, there is the possibility that excessive thermal transition (cold shock) be imparted to the whole of the primary main cooling system for the reactor.

When the flow guide structure 30 comprising the ring plate and cylindrical perforated plate is provided and when a thermal stratification phenomenon occurs in the reactor vessel due to a density-difference effect of the coolant as shown in FIG. 9, a coolant flow passage is shut off by the flow guide structure 30, and the coolant in the upper plenum 24 is not agitated. As a result, the high-temperature sodium is left alone, and much time is required before the disappearance of a thermal stratification interface 60. At the thermal stratification interface 60, the portion of the reaction vessel 10 which contacts the high-temperature sodium and the portion thereof which contacts the low-temperature sodium have a thermal expansion difference, and large strain would therefore occur in the reactor vessel 10.

Furthermore, the flow guide structure 30 comprising the ring plate and cylindrical perforated plate cannot prevent the sloshing of the coolant at the free liquid surface 50 during an earthquake, and it is also difficult to prevent the fluctuation of the liquid surface accompanied by the thermal shrinkage of the coolant (liquid level change) at the time of the plant tripping.

SUMMARY OF THE INVENTION

An object of the present invention is to provide an in-vessel structure for a fast reactor, capable of securing the safety of an operation of the fast reactor by preventing gas entrainment in a coolant due to the fluctuation of a free liquid surface; preventing the fluctuation of the liquid surface owing to the excessive heat transition to the primary main cooling system or the thermal shrinkage of the coolant which occur in a transition condition at the time of the emergency shutdown of the reactor; early eliminating a thermal stratification interface when a temperature stratification phenomenon should occur; and improving the operation controllability concerning the prevention of the sloshing of the liquid surface during an earthquake.

The present invention is directed to an in-vessel structure for a top-entry type fast reactor comprising a reactor core disposed in a reactor vessel; an upper core structure disposed above the core; an upper plenum occupied in the upper portion of the reactor vessel above the core, a free liquid surface of a coolant being in the upper plenum; a cold leg piping inserted into the reactor vessel from the top thereof and led to the core; and a hot leg piping extended from the upper plenum to the outside of the reactor vessel through the top thereof; the coolant being introduced through the cold leg piping to the core in which it is heated, then flowing out from the core into the upper plenum and being discharging through the hot leg piping to the outside of the reactor vessel.

The characteristics of the present invention resides in that a plurality of annular fins are fixed horizontally in an axially spaced manner to both the portions of an outer circumferential surface of the upper core structure and the opposite portions of an inner circumferential surface of the reactor vessel, said portions being under the free liquid surface during a rated operation of the reactor.

Preferably, the annular fins fixed to both the upper core structure and the reactor vessel are respectively provided in a plurality of axially spaced stages. The width of each of the annular fins is as small as around 5 to 15% of a distance between the inner circumferential surface of the reactor vessel and the outer circumferential surface of the upper core structure. When this width of fin is too small, an upward flow of coolant along the reactor vessel wall and a downward flow thereof along the upper core structure cannot be stopped, and, conversely, when the width is too large, the flow of the coolant is excessively interrupted.

PREFERRED EMBODIMENTS OF THE INVENTION

Figure 1:
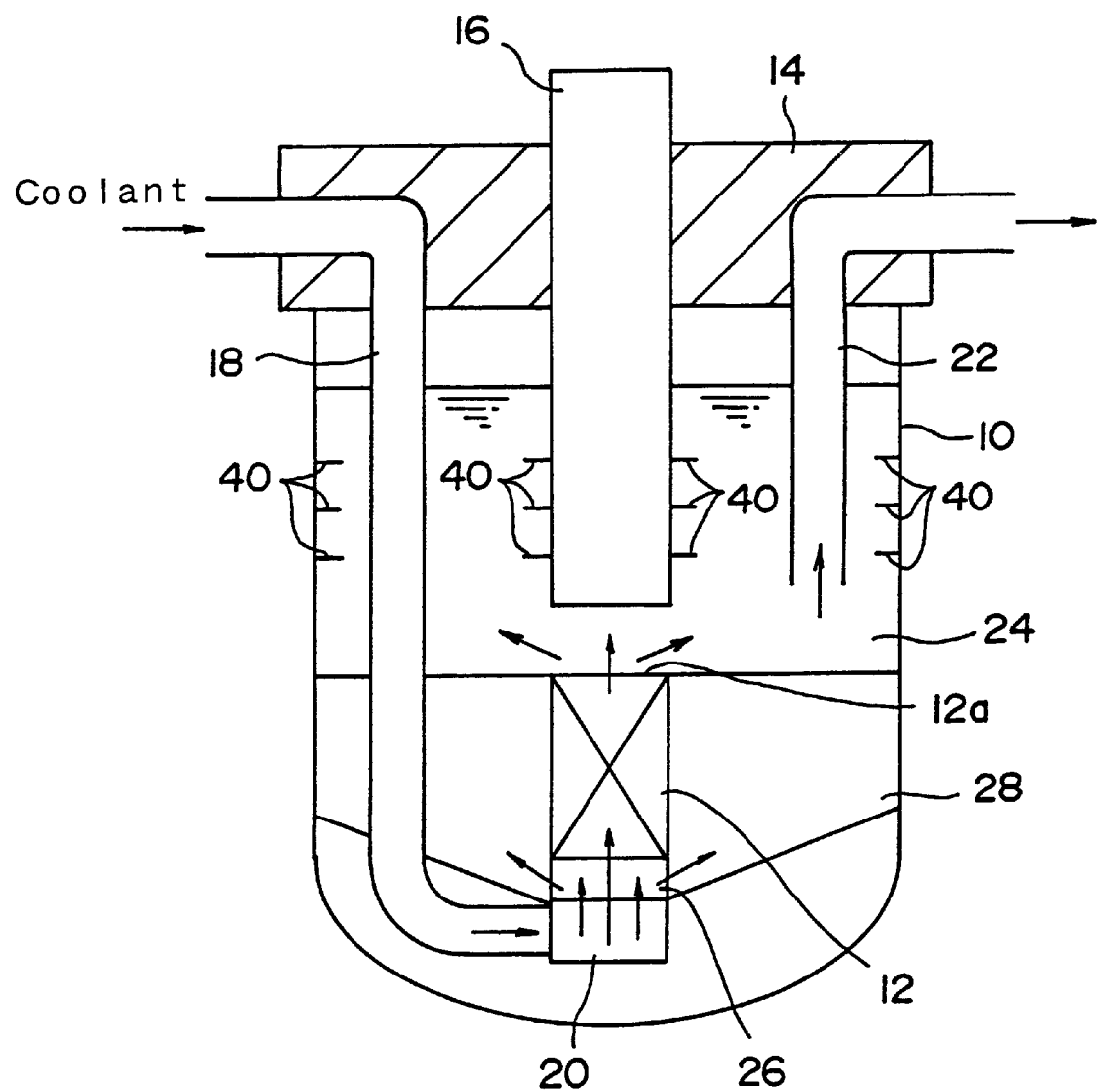
FIG. 1 is an explanatory view showing an example of an in-vessel structure for a fast reactor according to the present invention.

FIG. 1 shows an example of an in-vessel structure for a fast reactor according to the present invention. Since the basic reactor construction is substantially identical with that of the prior art described hereinbefore, the corresponding parts are designated by the same reference numerals so as to have the description of the present invention easily understood. In a fast reactor, a reactor core 12 is positioned in the interior of a reactor vessel 10, and an upper opening of the reactor vessel 10 is closed with a shielding plug 14. An upper core structure 16 is fixed to the shielding plug 14, and a cold leg piping 18 is introduced from an upper portion of the reactor vessel 10 into a high-pressure plenum 20, while a hot leg piping 22 is led out to the outside of the upper portion of the reactor vessel 10. A plurality of (for example, three) primary main cooling systems, each of which includes the cold and hot leg pipings 18 and 22, are usually provided, so that three cold leg pipings 18 and three hot leg pipings 22 are incorporated. In addition to these parts, four heat exchangers (DHX) of an auxiliary direct core cooling system (not shown) are provided.

The coolant sodium is supplied from the cold leg piping 18 to a high-pressure plenum 20, and passes through a low-pressure plenum 26 to reach the core 12, in which it is heated. The heated cooling sodium flows out from a core outlet surface 12a into an upper plenum 24, and reaches an intermediate heat exchanger (not shown) outside the reactor vessel through the hot leg piping 22. A part of the coolant sodium passing through the low-pressure plenum 26 flows out to an intermediate plenum 28.

According to the present invention, a plurality of (three in this embodiment) annular fins 40 are fixed horizontally, in a substantially equally spaced manner in the axial (i.e., vertical) direction, to both the portions of an outer circumferential surface of the upper core structure 16 and the opposite portions of an inner circumferential surface of the reactor vessel 10. These portions are under the free liquid surface formed when the reactor is in a rated operation. Each annular fin 40 in this embodiment is completely continuous over the whole circumference thereof, and set to a width around 10% of a distance between the inner circumferential surface of the reactor vessel 10 and the outer circumferential surface of the upper core structure 16.

Figure 2:
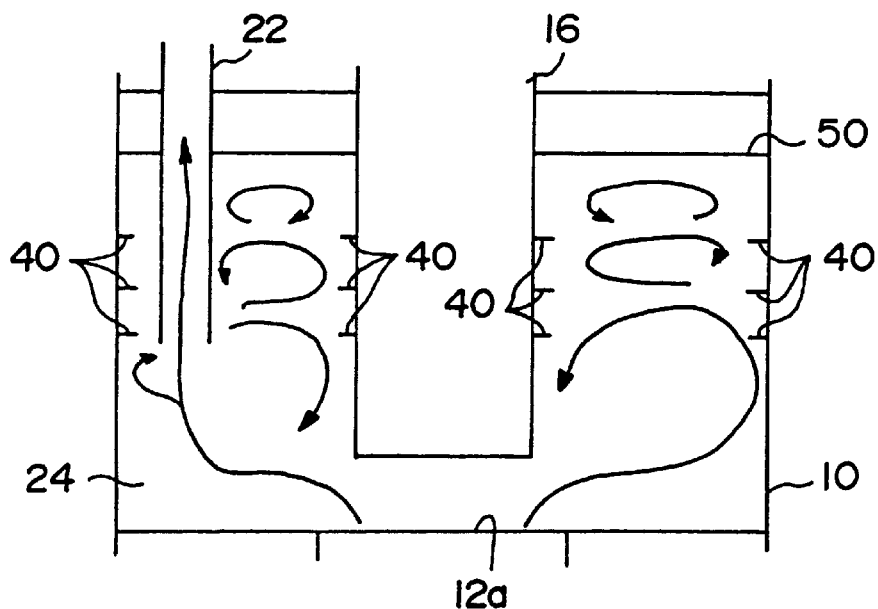
FIG. 2 is an explanatory view showing a flow pattern of a coolant in an upper plenum according to the present invention.

FIG. 2 shows the flow pattern in the fast reactor during the rated operation. The high-velocity coolant flowing out from the core outlet surface 12a impinges upon a lower surface of the upper core structure 16 to form a diagonal flow advancing toward the reactor vessel wall. Although this diagonal flow turns into an upward flow along the reactor vessel wall, a further upward movement thereof is stopped by the annular fins 40 provided on the reactor vessel 10. Thus the upward flow fails to further move up and turns into vortexes in a region below the free liquid surface 50. As a result, the inner flow cannot reach the free liquid surface 50, and the fluctuation of the liquid surface is thereby prevented. The vortexes comprising a surplus upward flow which cannot be stopped by the annular fins provided on the reactor vessel wall are restrained by the annular fins 40 provided on the outer circumferential surface of the upper core structure 16. Owing to a combination of these effects, the fluctuation of the liquid surface 50 is effectively minimized.

Figure 3:
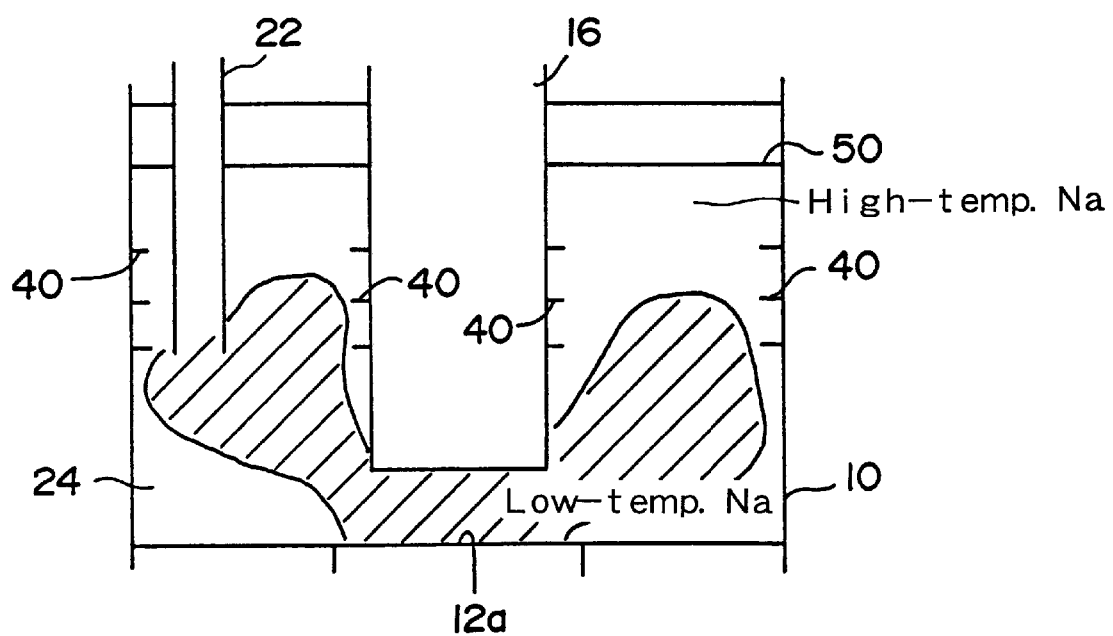
FIG. 3 is an explanatory view showing the in-vessel condition at the time of emergency shutdown of the reactor according to the present invention.
Figure 4:
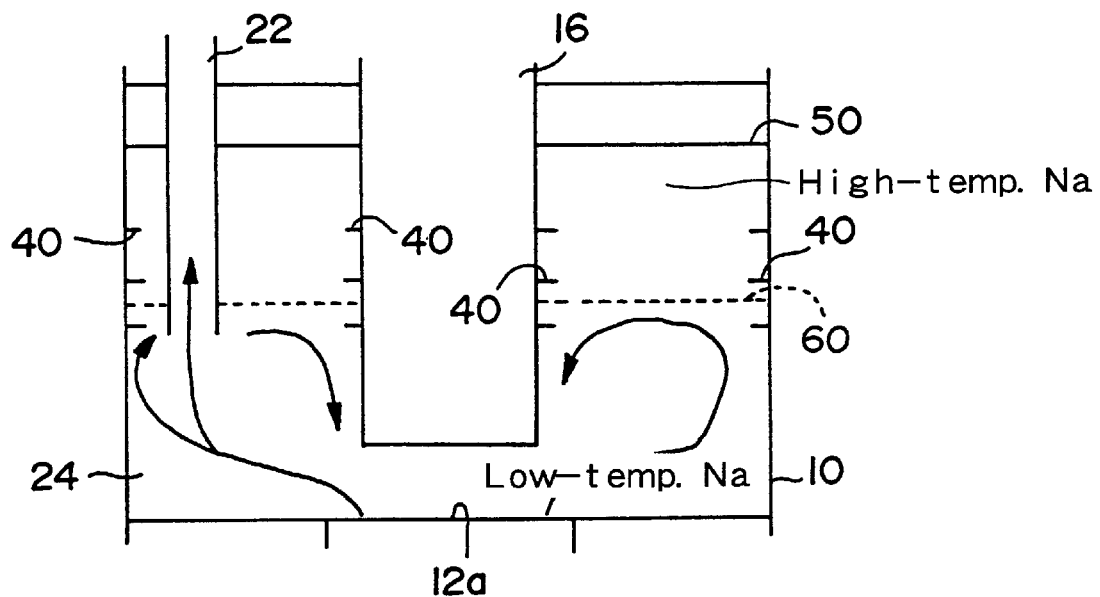
FIG. 4 is an explanatory view showing a flow pattern of a coolant at the time of occurrence of a thermal stratification phenomenon according to the present invention.

FIG. 3 is an explanatory view showing a case where the emergency shutdown (plant tripping) of the reactor occurs. Although the low-temperature sodium flows out at a low flow velocity from the core outlet surface 12a, the heat transition to the primary main cooling system can be lessened since substantially the whole region of the interior of the upper plenum 24 can be utilized as an effective mixing space. When a thermal stratification phenomenon occurs in the reactor vessel due to a density-difference effect of the coolant as shown in FIG. 4, the early elimination of a thermal stratification interface 60 can be effected since substantially the whole region of the interior of the upper plenum 24 can similarly be utilized as an effective mixing space.

Figure 5:
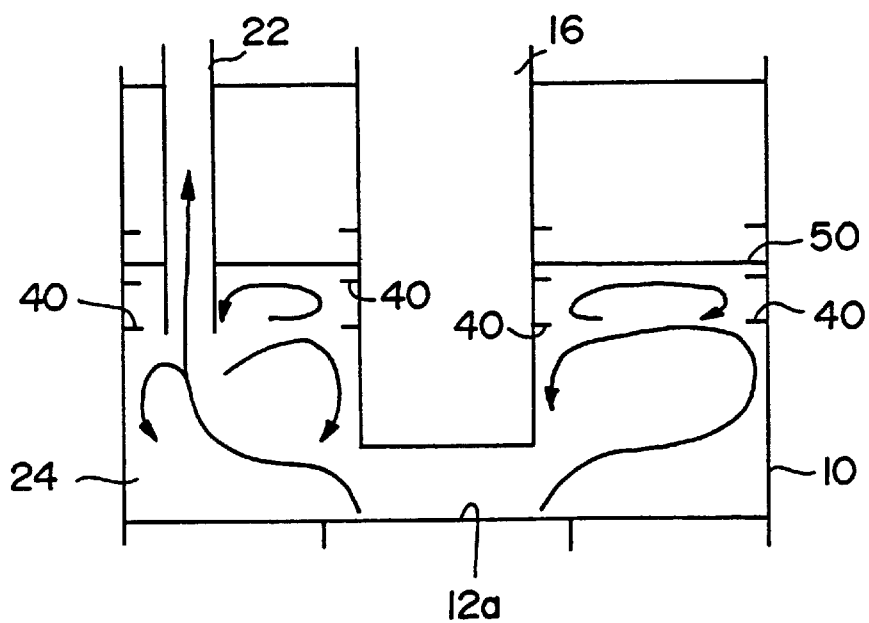
FIG. 5 is an explanatory view showing a flow pattern at the time of the lowering of a liquid level according to the present invention.
Figure 6:
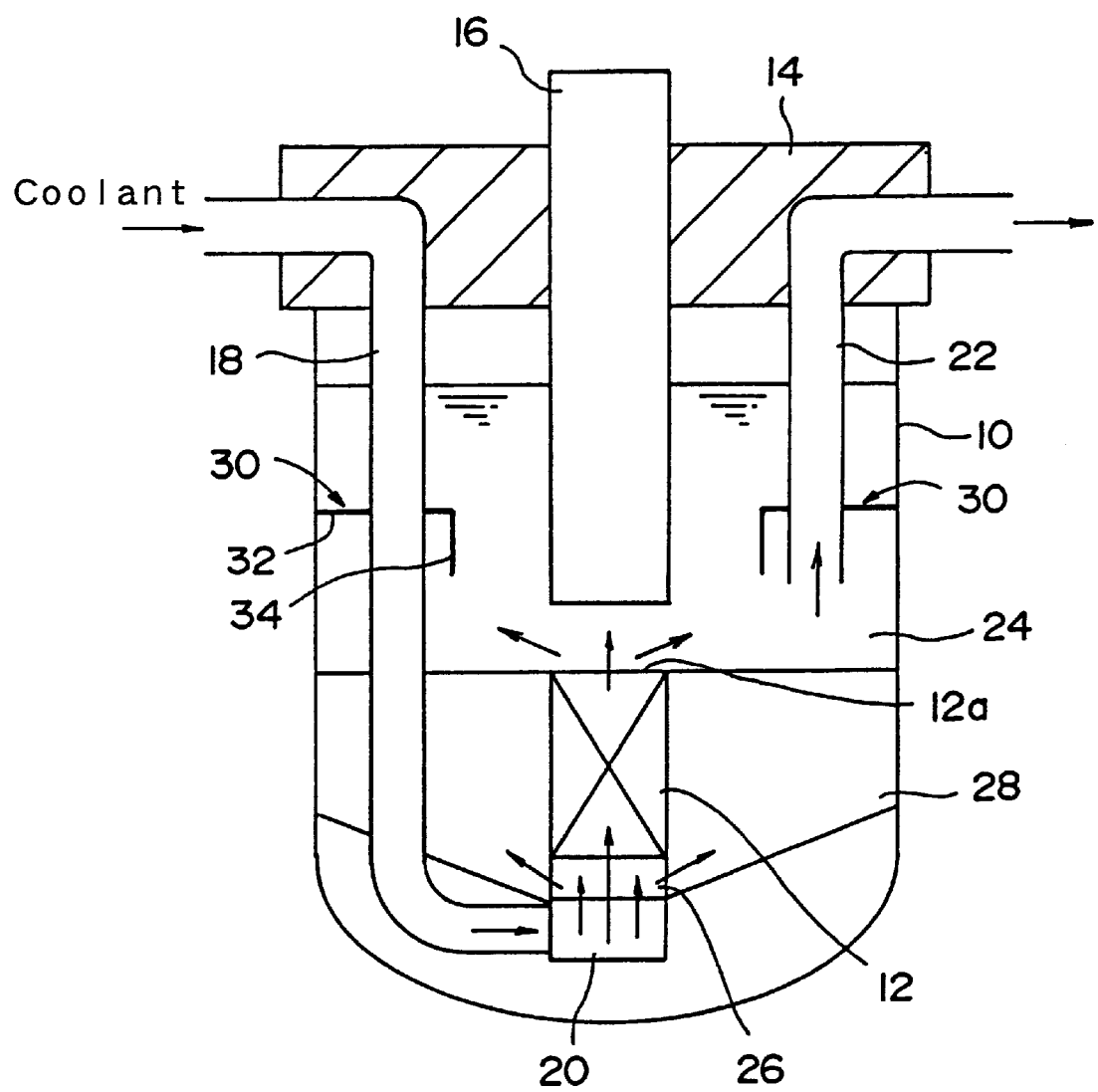
FIG. 6 is an explanatory view showing an example of a conventional in-vessel structure for a fast reactor.
Figure 7A:
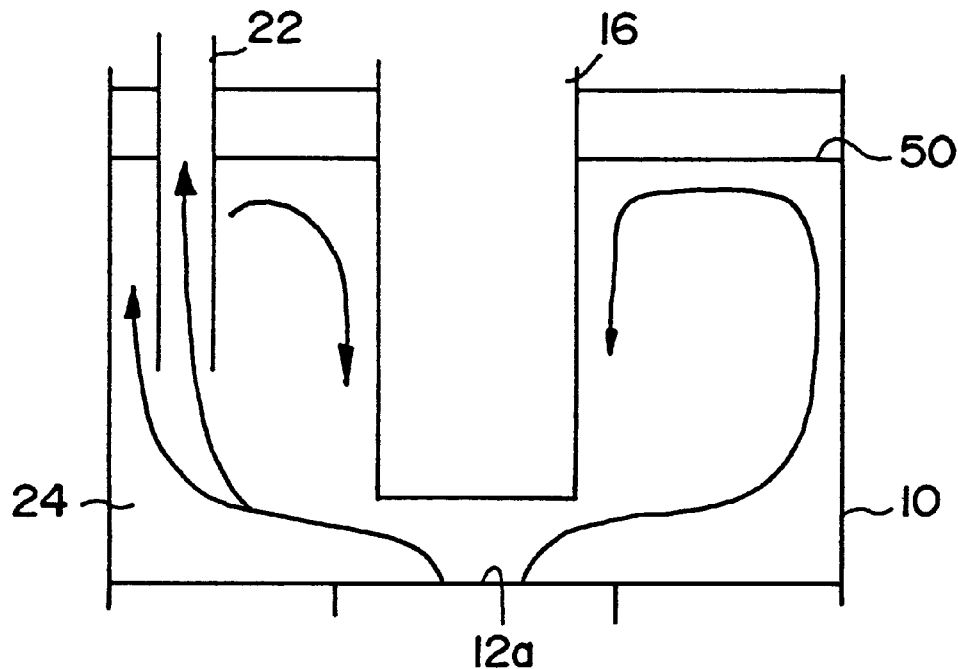
FIGS. 7A and 7B are explanatory views showing flow patterns of a coolant in an upper plenum in the conventional in-vessel structure.
Figure 7B:
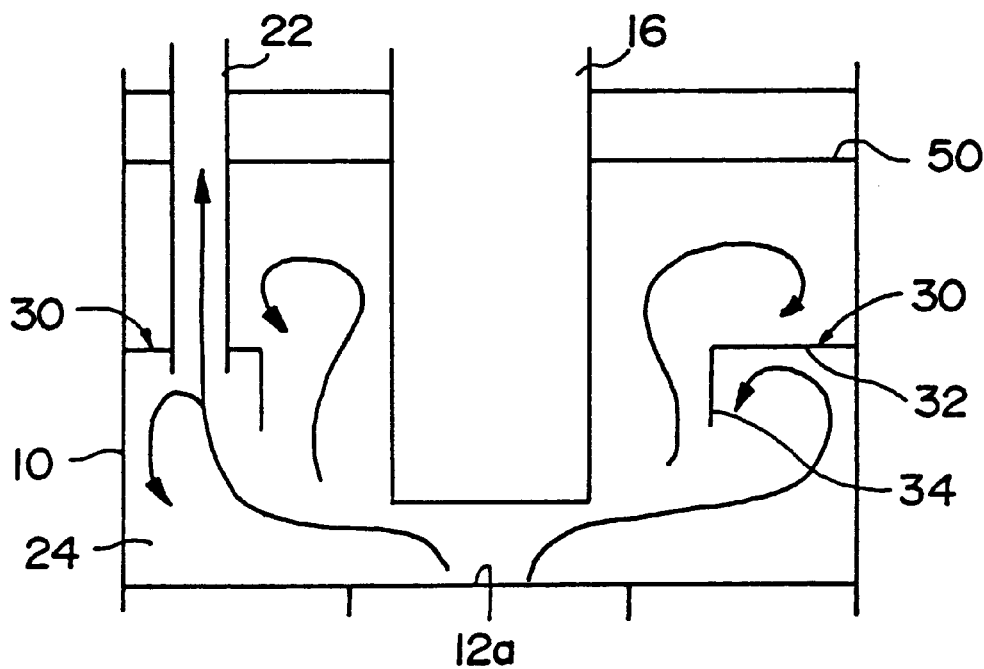
Figure 8:
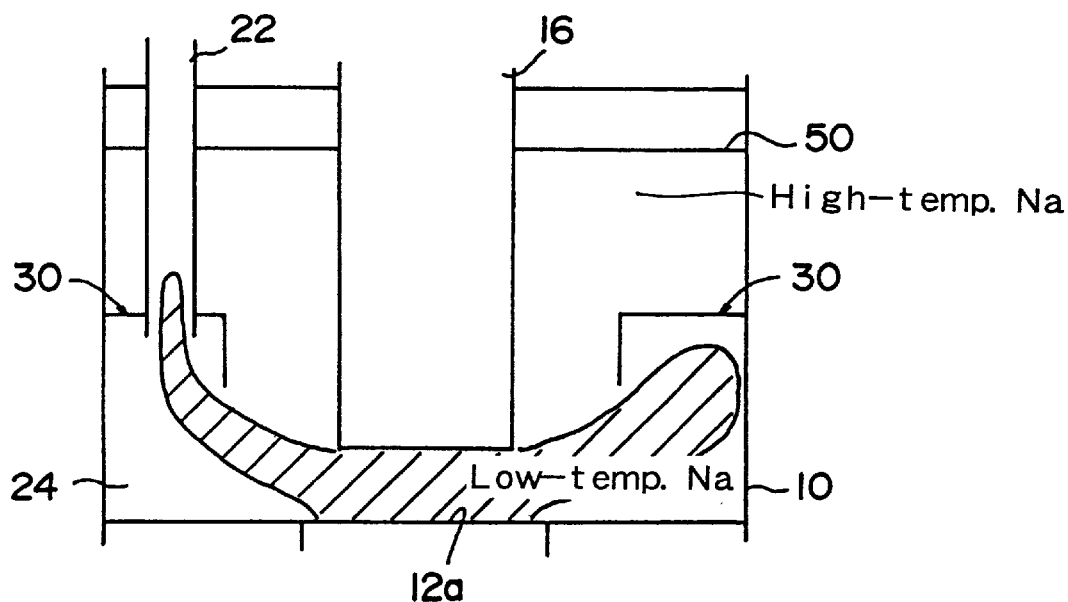
FIG. 8 is an explanatory view showing the in-vessel condition at the time of emergency shutdown of the reactor of the conventional in-vessel structure.
Figure 9:
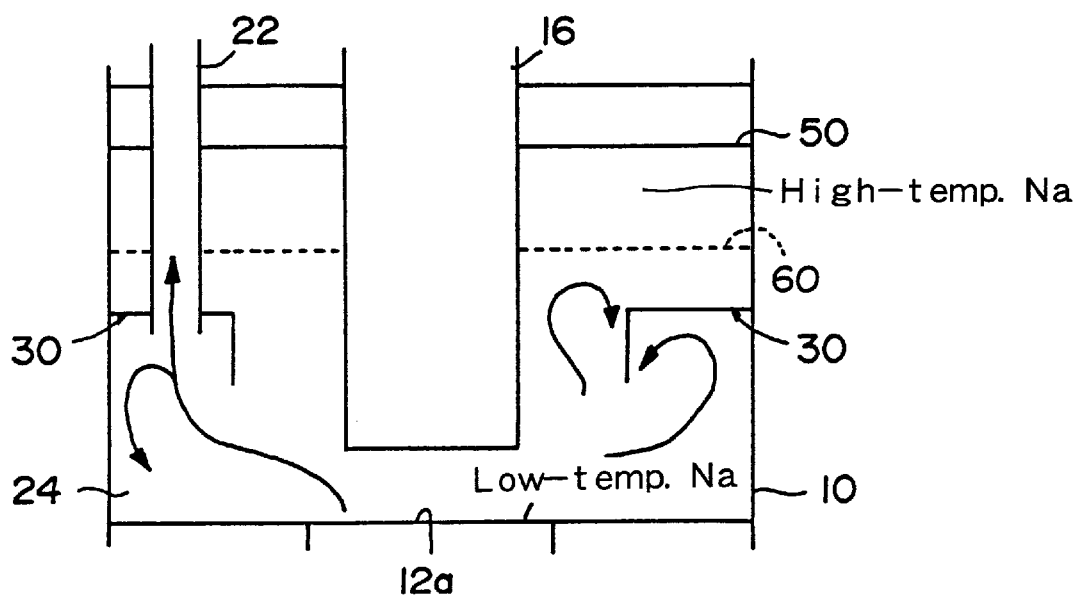
FIG. 9 is an explanatory view showing a flow pattern of a coolant at the time of occurrence of a thermal stratification phenomenon in the conventional in-vessel structure.

FIG. 5 shows an in-vessel flow of the coolant in a case where the free liquid surface 50 lowers with an earthquake occurring. Even when the free liquid surface 50 lowers, some annular fins 40 in lower stages out of a plurality thereof are kept immersed in the coolant. Therefore, the fluctuation (sloshing) of the free liquid surface can be effectively lessened.

In the above embodiment, the annular fins 40 are formed continuously over the whole circumference of the reactor vessel 10, i.e., they are formed like complete rings but they may not necessarily be completely continuous over the whole circumference of the reactor vessel. Namely, each of the annular fins may comprise a certain number of arcuate parts arranged in the same plane in a slightly space manner. When such discontinuous annular fins are used, the clearances among the arcuate parts in one stage shall not be aligned with those among the arcuate parts in an adjacent stage, e.g., the arcuate parts shall be arranged in a half interval staggered manner.

EXAMPLE

An analysis was made with an inner structure for a fast reactor vessel, having the following sizes of various parts thereof used.

Diameter of a reactor vessel: 6 m

Diameter of an upper core structure: 2 m

Height of a free liquid surface: 4.5 m

Positions of annular fins:
  Fins in an upper stage:
    1.5 m below the free liquid surface
  Fins in an intermediate stage:
    2.25 m below the free liquid surface
  Fins in a lower stage:
    3 m below the free liquid surface Width of the annular fins: 0.26 m The numerical calculations were made by using a general purpose multidimensional thermal flow analysis code AQUA-VOF. As a result, it could be ascertained that this in-vessel structure was effective for lessening the sloshing of the liquid surface and very effective for preventing the gas entrainment in the coolant. The flows of sodium shown in FIGS. 2–5 and 7–9 are drawn schematically on the basis of the results of the analytic calculations.

As being understood from the foregoing, according to the present invention, the inner flow of the coolant advancing upward along the reactor vessel wall is stopped, whereby the sloshing of the free liquid surface can be effectively prevented. This enables the gas entrainment in the coolant which is ascribed to the sloshing of the free liquid surface to be prevented, and the safety of an operation of the fast reactor to be secured. Also in the present invention, since substantially the whole region of the interior of the upper plenum can be utilized as an effective mixing space in a transition condition at the time of the emergency shutdown (plant tripping) of the reactor, the excessive heat transition to the primary main cooling system can be lessened and the early elimination of a thermal stratification interface at the time of occurrence of a thermal stratification phenomenon can be effected. Moreover, it is also possible to minimize the sloshing of the free liquid surface during an earthquake, prevent the fluctuation of the free liquid surface accompanied by the thermal shrinkage of the coolant (liquid level change) at the time of emergency shutdown of the reactor, and improve the plant operation controllability.

What is claimed is:

1. An in-vessel structure for a fast reactor comprising a reactor core disposed in a reactor vessel;

an upper core structure disposed above said core;

an upper plenum occupied in the upper portion of said reactor vessel above said core, a free liquid surface of a coolant being in said upper plenum;

a cold leg piping inserted into said reactor vessel from the top thereof and led to said core; and a hot leg piping extended from said upper plenum to the outside of said reactor vessel through the top thereof;

the coolant being introduced through said cold leg piping to said core in which it is heated, flowing out from said core into said upper plenum and being discharging through said hot leg piping to the outside of said reactor vessel;

characterized in that a plurality of annular fins are fixed horizontally in an axially spaced manner to both the portions of an outer circumferential surface of said upper core structure and the opposite portions of an inner circumferential surface of said reactor vessel, said portions being under said free liquid surface during a rated operation of said reactor.

2. An in-vessel structure for a fast reactor according to claim 1, wherein said annular fins fixed to both said upper core structure and said reactor vessel are provided in a plurality of axially spaced stages respectively, the width of each of said fins being 5 to 15% of a distance between the inner circumferential surface of said reactor vessel and the outer circumferential surface of said upper core structure.

\* \* \* \* \*